(12) United States Patent
Lang

(10) Patent No.: US 7,047,716 B2
(45) Date of Patent: May 23, 2006

(54) CONVERTIBLE SUPPORT

(75) Inventor: Derek Alan Lang, Raleigh, NC (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 10/375,976

(22) Filed: Feb. 28, 2003

(65) Prior Publication Data

US 2004/0168421 A1    Sep. 2, 2004

(51) Int. Cl.
*A01F 34/63* (2006.01)

(52) U.S. Cl. ............................................. 56/16.7; 56/1

(58) Field of Classification Search ............... 56/232, 56/16.7, 16.5, 1; 172/433, 434, 435; 296/66, 296/65.06, 190.08; 297/195.11, 335, 195.1, 297/214
See application file for complete search history.

(56) References Cited

U.S. PATENT DOCUMENTS

| | | | |
|---|---|---|---|
| 483,265 A * | 9/1892 | Schindler ..................... 297/313 |
| 1,268,800 A | 6/1918 | Adelsperger et al. |
| 1,525,743 A | 2/1925 | Jack |
| 2,318,751 A | 5/1943 | Carlson |
| 2,565,666 A | 8/1951 | Schaefer |
| 3,037,570 A * | 6/1962 | Olson .......................... 180/6.5 |
| 3,076,517 A | 2/1963 | Henry-Biabaud |
| 3,279,850 A | 10/1966 | Saemann et al. |
| 3,485,314 A | 12/1969 | Herr |
| 3,754,787 A * | 8/1973 | Garber ..................... 297/195.1 |
| 3,924,891 A | 12/1975 | Williams |
| 4,054,319 A | 10/1977 | Fogg, Jr. et al. |
| 4,165,127 A | 8/1979 | Vago |
| 4,531,459 A | 7/1985 | Yamada |
| 4,591,208 A | 5/1986 | McDonald et al. |
| 4,878,339 A | 11/1989 | Marier et al. |
| 5,044,472 A | 9/1991 | Dammeyer et al. |
| 5,065,967 A | 11/1991 | Murakami et al. |
| 5,106,256 A | 4/1992 | Murakami et al. |
| 5,118,123 A | 6/1992 | Betrock |
| 5,295,728 A * | 3/1994 | Schaevitz ................. 297/195.1 |
| 5,364,151 A | 11/1994 | Yurasits |
| 5,463,853 A | 11/1995 | Santoli et al. |
| 5,913,802 A | 6/1999 | Mullet et al. |
| 5,947,490 A | 9/1999 | Munnoch et al. |
| 6,189,964 B1 * | 2/2001 | Henshaw et al. ............ 297/112 |
| 6,205,753 B1 | 3/2001 | Velke et al. |
| 6,481,730 B1 | 11/2002 | Sung |
| 6,490,849 B1 | 12/2002 | Scag et al. |
| 6,516,596 B1 * | 2/2003 | Velke et al. .................. 56/14.7 |
| 6,845,829 B1 * | 1/2005 | Hafendorfer ............... 180/6.48 |

* cited by examiner

*Primary Examiner*—Meredith Petravick

(57) ABSTRACT

A mower including support for an operator in a standing position during use thereof. Specifically, the mower includes a support against which an operator may lean when operating the mower in the standing position. Additionally, the support includes a portion capable of being straddled and then sat upon by the operator. This capability allows the operator to relieve at least some of the pressure applied to his/her body during extended periods of standing on the platform.

5 Claims, 2 Drawing Sheets

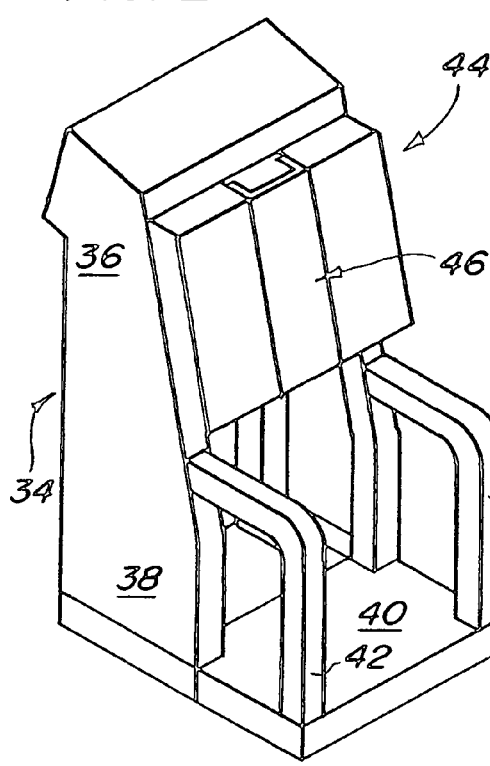
FIG. 2
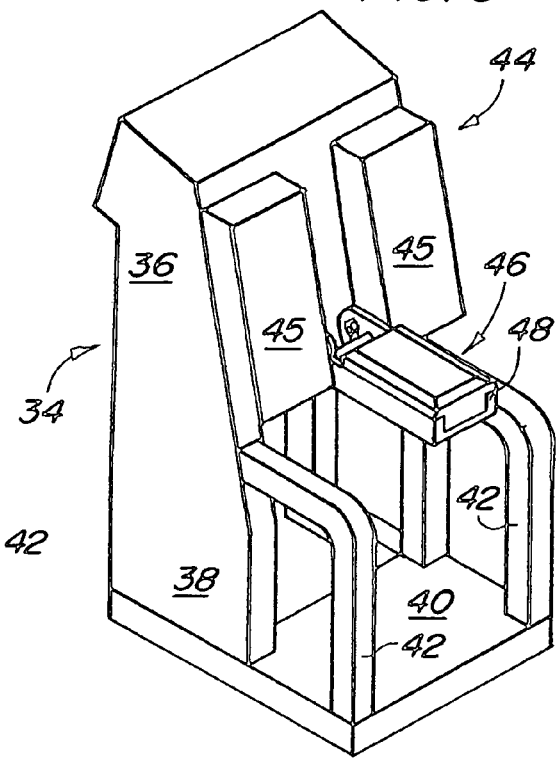
FIG. 3
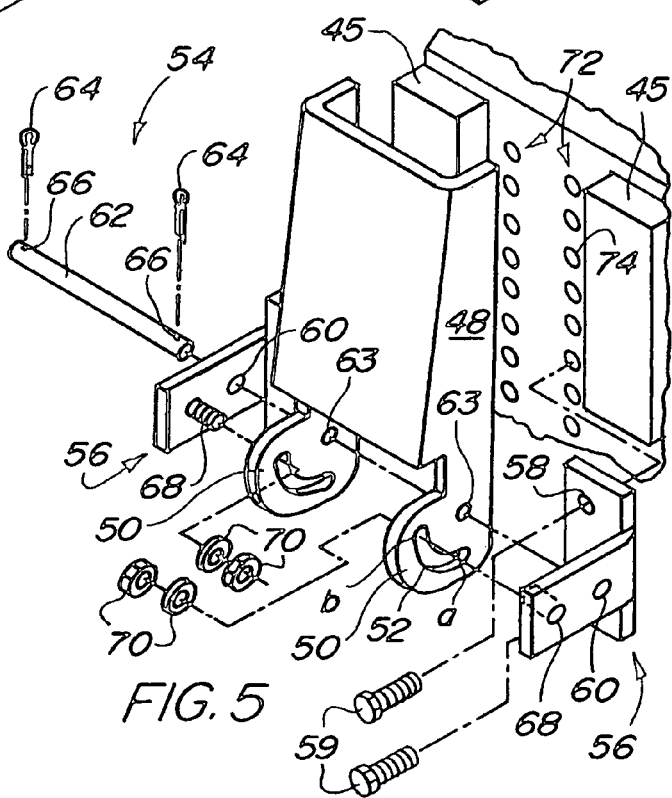
FIG. 4
FIG. 5

CONVERTIBLE SUPPORT

BACKGROUND OF THE INVENTION

This invention relates generally to grass and vegetation mowing equipment, and more specifically to operator supports on riding mowers that a person may operate in a standing position. These mowers may have an operator station that includes a horizontal platform at the rear of the vehicle on which the operator stands. The operator's station also includes an upright support section positioned in front of the operator that may include controls for operating the mower.

SUMMARY OF THE INVENTION

The support section of the operator's station includes a convertible portion that pivots outwardly from an upright position to an outwardly folded position. The convertible portion of the support section provides a seat that the operator may use while mowing.

THE DRAWINGS

FIG. 2 is a side perspective and elevated view of the operator station of the mower according to FIG. 1.

FIG. 3 is a side perspective and elevated view of the operator station in which a portion of the station's support is folded outwardly from the remainder thereof.

FIG. 4 is a side perspective view of the base portion of the member which is folded outwardly in FIG. 3.

FIG. 5 is a side perspective and exploded view of the mount and other hardware which is to be used in connecting the outwardly folded member to the operator station.

DETAILED DESCRIPTION OF THE DRAWINGS

Figure 1:
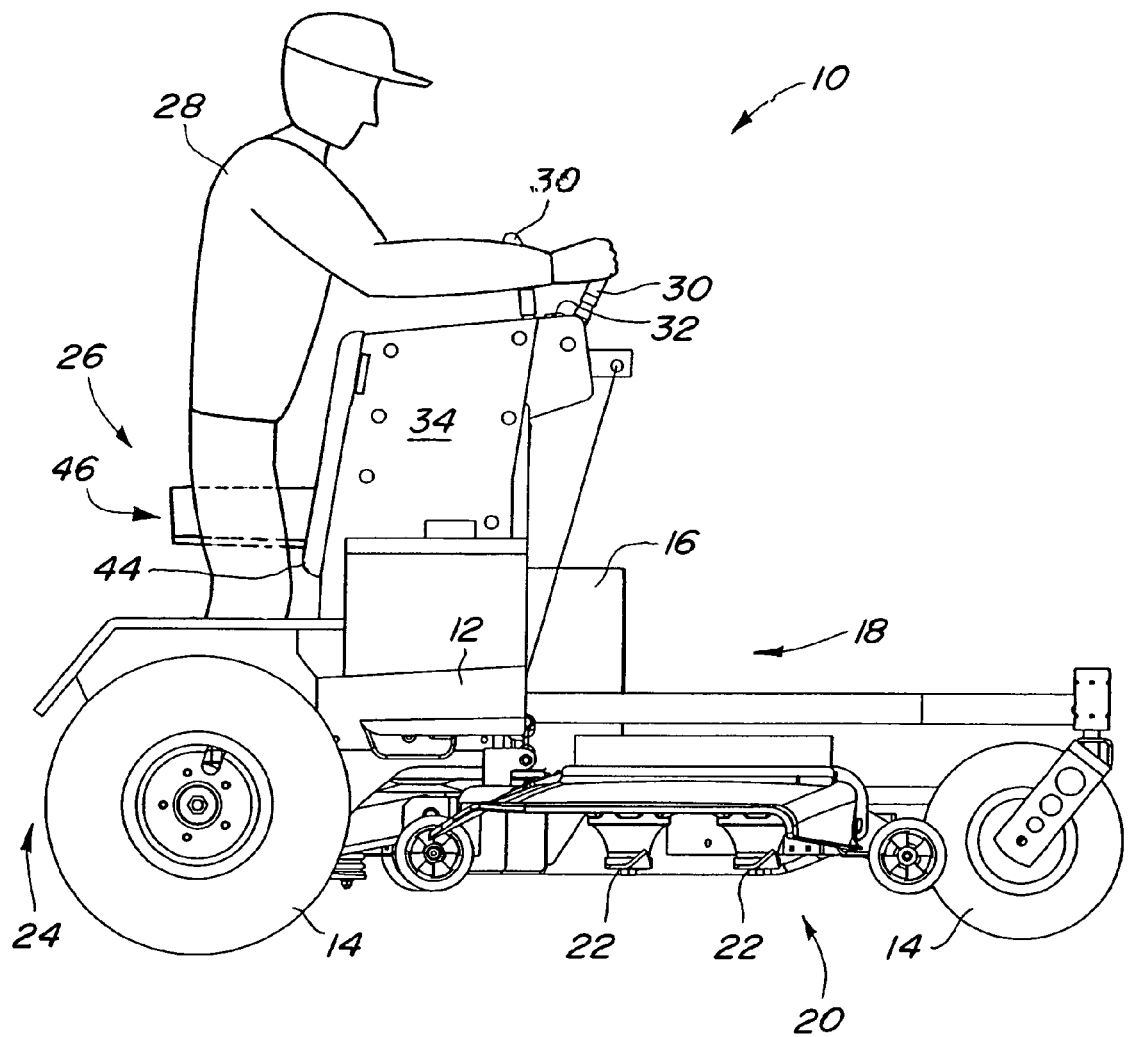
FIG. 1 is a side view of a mower in which an operator is depicted in a standing position.

Looking to FIG. 1, there is shown a vehicle, in the form of a mower 10, on which an operator stands during its use. The mower 10 includes a frame 12 supported upon a plurality of ground engaging wheels 14. An engine 16 is carried by the frame 12 at the front portion 18 of the mower 10. A cutting chamber 20 is suspended from the frame 12 adjacent the engine 16. The chamber 20 carries within it multiple cutting blades 22 which are powered by the engine 16. At the rear 24 of the mower 10, there is provided an operator's station 26 in or on which an operator 28 is located when the mower 10 is to be used. From this location, it can be seen that the operator 28 can manipulate various apparatuses 30,32 which are used in controlling operation of the mower 10.

It is to be noted that although the vehicle discussed herein is a mower, other types of vehicles on which an operator stands during operation thereof are also contemplated; accordingly, such other types of vehicles are foreseen as being adaptable to the structure that is discussed throughout the Detailed Description.

Looking to FIG. 2, the operator station 26 is shown as being isolated from the rest of the mower 10. As shown, the station 26 includes a podium 34 having upper and lower portions 36,38, respectively. An extended platform 40 on which the operator 28 stands while operating the mower 10 is attached to the lower portion 38 of the podium 34. Rails 42 are also attached to the lower portion 38 and to the platform 40 to assist in separating the operator station 26 from adjacent portions of the mower 10.

Still referring to FIG. 2, the operator station 26 further includes a support section 44, generally provided as a body of padded material against which the operator may comfortably lean and gain stability when operating the mower 10 in a standing position. It is to be understood that the material chosen for use in constructing the support may be selected from a combination of plastic and/or rubber, and layered foam; or other material combinations having similar properties.

Looking to FIG. 3, it can be seen that the support section 44 includes portions 45 which are stationary relative to the operator station, as well as a portion 46 which is convertible from its upright position as shown in FIG. 2 to an outwardly folded or pivoted position. Because this portion 46 does pivot outwardly as shown, the operator is provided with a rest which may be straddled and then sat upon so as to receive a portion of the operator's weight. The folding capability of the convertible portion 46 thus provides the operator 28 with a vertical support to relieve some of the pressure applied to his/her body during extended periods of standing on the platform 40. Accordingly, depending on whether the portion 46 is used in its upright or its outwardly folded position, the operator will be positioned at a different stance relative to the platform 40; while still maintaining an ability to fully reach the controls 30,32 so as to be able to control the mower 10.

The convertible portion 46 is comprised of a base member 48 that includes a set of ears 50. Each of the ears 50 contains an accurate slot 52, as shown in FIGS. 4–5. As shown in FIG. 3, it is to be understood that the exterior surface(s) of the base member 48 is similarly covered by the padded material used in conjunction with the remainder of the support section 44.

Looking now to FIGS. 4 and 5, the support section 44 of the operator station 26 is also shown to include a mounting arrangement 54. The mounting arrangement 54 includes a pair of right angle brackets 56. Each of the brackets 56 includes an associated set of apertures 58 and mating bolts 59 for attachment with the podium 34. As shown in FIG. 3, the bolts 59 are received by rows 72 of apertures 74 to achieve that attachment.

The brackets 56 further include apertures 60 for receiving a pin 62 which is further received through openings 63 in the ears 50. The pin 62 is to be held to the ears 50 and each of the brackets 56 through the use of fasteners 64 which are to be inserted through openings 66 in the pin 62. The fasteners 64 are provided, optionally, in the form of cotter pins; other types of fasteners may also be used to achieve a similar result. Once the pin 62 is in place and secured with the ears 50 and the brackets 56, the convertible portion 46 is free to move, or extend, at least 90 to 100 degrees, optionally, from the remainder of the support section 44, as shown in FIG. 4. It is to be understood that it is contemplated that the convertible portion 46 (and structure used in attaching it to the support section 44) could be adapted to allow movement of the convertible portion to a different inclination than that which is mentioned above. Movement of the portion 46 is achieved simply by grabbing a part thereof and urging the portion 46 either toward or away from the remainder of the support section 44.

As further shown, each of the brackets 56 has a projection 68 attached thereto. Each of the projections 68 is held against an individual ear 50 by a nut and washer combination 70. As shown, the projection 68 fits within an individual slot 52 and acts as a stop device at points "a" and "b" so as to prevent further pivotal movement of the convertible portion 46. It is to be understood that the convertible portion 46 may be mounted with any one of the rows 72 of the apertures 74 in order to accommodate operators of different height.

Thus, there is provided a mower that includes a support having a first mode whereby an operator may lean against the support when operating the mower in the standing position. Further, the support includes a second mode whereby a portion of it may be converted from the first mode so as to enable the portion to be straddled and then sat upon by the operator. With each of these modes, there is an associated lateral and vertical force component received by at least a portion of the support.

Providing a portion of the support which may be sat upon allows the operator the opportunity to relieve some of the pressure applied to his/her body during long periods of standing on the platform; thereby obtain a greater level of comfort possibly extending the amount of time during which the mower is to be operated.

Having provided the above description, it will become apparent that various modifications can be made without departing from the scope of that description as further defined in the accompanying claims.

The invention claimed is:

1. An operator station on the rear of a riding mower having a generally horizontal platform and an upright support section located forwardly of the platform, the upright support section having three portions, the upright support section having a first mode in which the three portions are side-by-side and provide a rearwardly facing body of padded material, and a second mode in which two of the portions are stationary relative to the operator station and the third portion pivots rearwardly to form a seat extending over the platform with a shape that may be straddled.

2. The operator station of claim 1 wherein the pivoting portion is adjustable to various heights from the horizontal platform.

3. An apparatus comprising:
a riding mower having a rearwardly extending operator station; the operator station including a podium having upper and lower portions; an extended platform attached to and extending rearwardly from the lower portion of the podium; a pair of rails attached to the lower portion and to the platform; a padded support section with two stationary portions and a third pivotable portion between the stationary portions and having a first mode with all three portions facing rearwardly from the upper portion of the podium; the padded support section having a second mode in which the two stationary portions remain facing rearwardly and the third pivotable portion is pivoted over the extended operator station to provide a generally horizontal operator support.

4. The apparatus of claim 3 further comprising a plurality of mounting positions for the convertible portion of the padded support section.

5. The apparatus of claim 3 wherein the convertible portion may be straddled by a riding mower operator.

* * * * *